Jan. 6, 1925.  1,522,051
W. M. FULTON ET AL
METHOD OF MAKING FLEXIBLE CORRUGATED TUBULAR WALLS
Filed June 22, 1920  2 Sheets-Sheet 1

Inventor
Weston M. Fulton
Jean V. Giesler
By Mauro, Cameron, Lewis & Kerkam
Attorneys

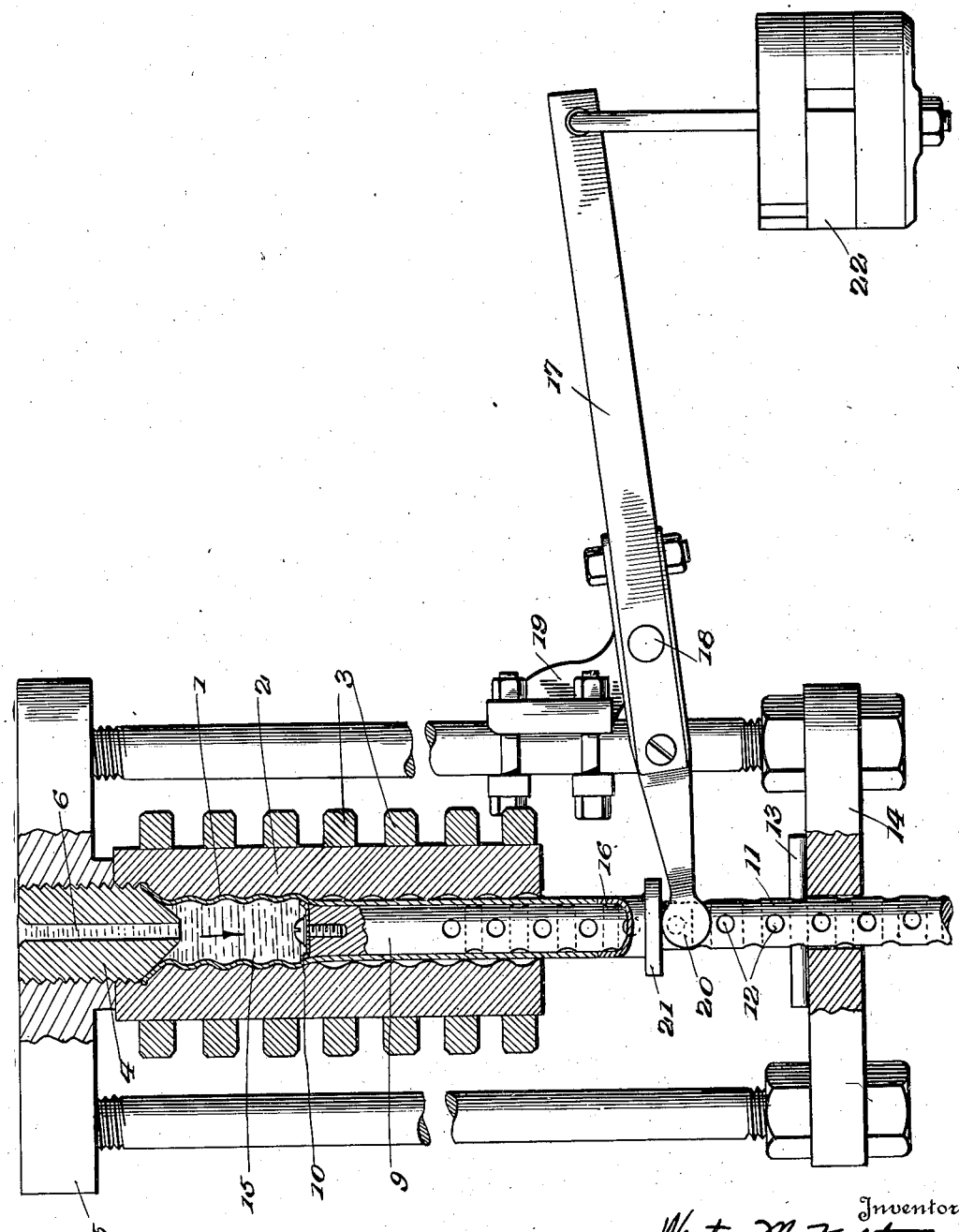

Patented Jan. 6, 1925.

1,522,051

UNITED STATES PATENT OFFICE.

WESTON M. FULTON AND JEAN V. GIESLER, OF KNOXVILLE, TENNESSEE, ASSIGNORS TO THE FULTON COMPANY, OF KNOXVILLE, TENNESSEE, A CORPORATION OF MAINE.

METHOD OF MAKING FLEXIBLE CORRUGATED TUBULAR WALLS.

Application filed June 22, 1920. Serial No. 390,981.

*To all whom it may concern:*

Be it known that we, WESTON M. FULTON and JEAN V. GIESLER, citizens of the United States, and residents of Knoxville, Tennessee, have invented new and useful Improvements in Methods of Making Flexible Corrugated Tubular Walls, which invention is fully set forth in the following specification.

This invention relates to the manufacture of relatively thin, flexible, tubular corrugated walls.

Corrugated walls have heretofore been manufactured by various mechanical methods, such as by stamping, spinning, rolling, the use of expanding dies, etc. These methods, however, owing to the character of the treatment of the wall by the mechanical elements engaging the same, have resulted to a greater or less extent in an undesirable stretching and thinning of the material of the wall. These methods, then, have not only produced a corrugated wall the thickness and strength of which is not uniform, but also have tended to develop weak spots in the material of the wall which rupture prematurely. It is an object of this invention to provide a method of making flexible corrugated tubular walls which substantially avoids the undesirable stretching and thinning of the wall characteristic of mechanical methods heretofore employed.

It has also been suggested to corrugate walls by forcing the wall by hydrostatic pressure into a corrugated die or form. If the wall has been held against longitudinal displacement during the pressing operation, the formation of the corrugations has been attended by an undue stretching and thinning of the material as much or more than in the mechanical methods heretofore discussed. Similarly, if the wall has been subjected to hydrostatic pressure throughout its extent at the surface to be corrugated, a similar result has been obtained because the application of equal force on each side of the respective ridges in the die has displaced the material of the wall transversely without permitting a corresponding longitudinal movement thereof. It is an object of this invention to provide a method of making flexible corrugated tubular walls employing transverse pressure which substantially avoids undue stretching and thinning of the wall attendant on the aforesaid methods employing hydrostatic pressure.

It has also been suggested in the manufacture of tubular corrugated walls to position the wall in operative relation to a corrugated tubular die, position opposed plungers in the tube so as to protect from hydrostatic pressure all but a small portion of the wall, and subject the exposed portion of the wall to hydrostatic pressure while moving one or both of the plungers axially of the tube to progressively expose fresh portions of the wall to the hydrostatic pressure. This method has been productive of corrugated walls wherein the material has been stretched and thinned to a less extent but has not entirely overcome the undesirable stretching and thinning of the material because, for the material to flow into each corrugation of the die as it is subjected to the hydrostatic pressure, the uncorrugated portion of the wall must move axially with freedom, whereas it has frictional engagement with the die and the plunger or plungers, whereby free movement of the uncorrugated portion of the wall is opposed with a resultant undesirable stretching and thinning of the material. Moreover, as the hydrostatic pressure must be increased with the increase in thickness of the wall and as the friction increases with the hydrostatic pressure, experience has demonstrated that with an increase of thickness of the wall the tendency to effect an undesirable stretching and thinning of the wall has also increased. It is an object of this invention to provide a method of making flexible corrugated tubular walls by progressively subjecting the wall to transverse pressure while avoiding the undesirable stretching and thinning attendant on the methods heretofore employed.

It has also been suggested to corrugate tubular walls by subjecting the tube to end pressure while the tube is filled with a liquid. This method has effected the corrugations by subjecting the material of the wall to a crushing or buckling pressure, the contained liquid constituting a variable counter die that prevents collapse of the wall other than into the corrugations of the forming die. This method of procedure, however, is defective when applied to relatively thin walls because the subjection of relatively thin material to only a buckling or crushing pressure not only tends to cause buckling in the weaker portions of the wall but also is productive of what is known in the art as "body wrinkles," which cannot afterward be removed. It is an object of this invention to provide a method of making flexible corrugated tubular walls wherein pressure is applied to the wall longitudinally to aid the formation of the corrugations but under such conditions as to not tend to produce buckling or the formation of "body wrinkles".

Another object of this invention is to provide a method of making flexible corrugated tubular walls by the combined action of forces of bending and compression.

A further object of this invention is to provide a method of making flexible corrugated tubular walls by hydrostatic pressure wherein the hydrostatic pressure is utilized both to expose fresh portions of the wall to said pressure and then to form the corrugations in the freshly exposed portions of the wall.

Yet another object of the invention is to provide a method of corrugating walls wherein the initial corrugations are formed by hydrostatic pressure and said corrugations are subsequently treated to render their bends of the desired resiliency.

A further object of the invention is to provide a method of making a flexible tubular corrugated wall which is of substantially uniform thickness throughout, and the thickness, longitudinal elements, or superficial area of which are substantially the same as the corresponding dimensions of the blank from which the wall is formed.

Other objects relate to the provision of a method of manufacturing flexible tubular corrugated walls which is simple and rapid and productive of a better wall of this character than heretofore obtained.

Broadly, the invention comprises a method of making flexible corrugated tubular walls by subjecting the wall to separate but simultaneous transverse and longitudinal forces so as to form the corrugations, by transverse pressure while applying a longitudinal force to the wall to overcome its opposition to longitudinal movement and to aid the flow of the material into the corrugations of the die. The invention also embraces a method of corrugating a wall by intermittently exposing fresh portions of said wall to hydrostatic pressure by the action of said pressure and alternately forming corrugations in the freshly exposed portion by said hydrostatic pressure. The invention also embraces the method of first forming corrugations in a wall by hydrostatic pressure and afterward treating the corrugations to render their bends resilient to the desired extent. The invention also embraces the method of making a flexible tubular corrugated wall which is of substantially uniform thickness and has its dimensions substantially the same as those of the blank from which it was formed as heretofore stated.

The invention is capable of receiving a variety of expressions in its mode of application one of which is described herein and diagrammatically illustrated on the accompanying drawings, but it is to be expressly understood that the selected exemplification is for purposes of illustration only and is not to be construed as a definition of the limits of the invention, reference being had to the appended claims for that purpose.

Referring to the drawings:

Fig. 2 is a schematic view on a larger scale illustrating suitable means for exerting both transverse and longitudinal pressure on the wall being corrugated.

Figure 1:
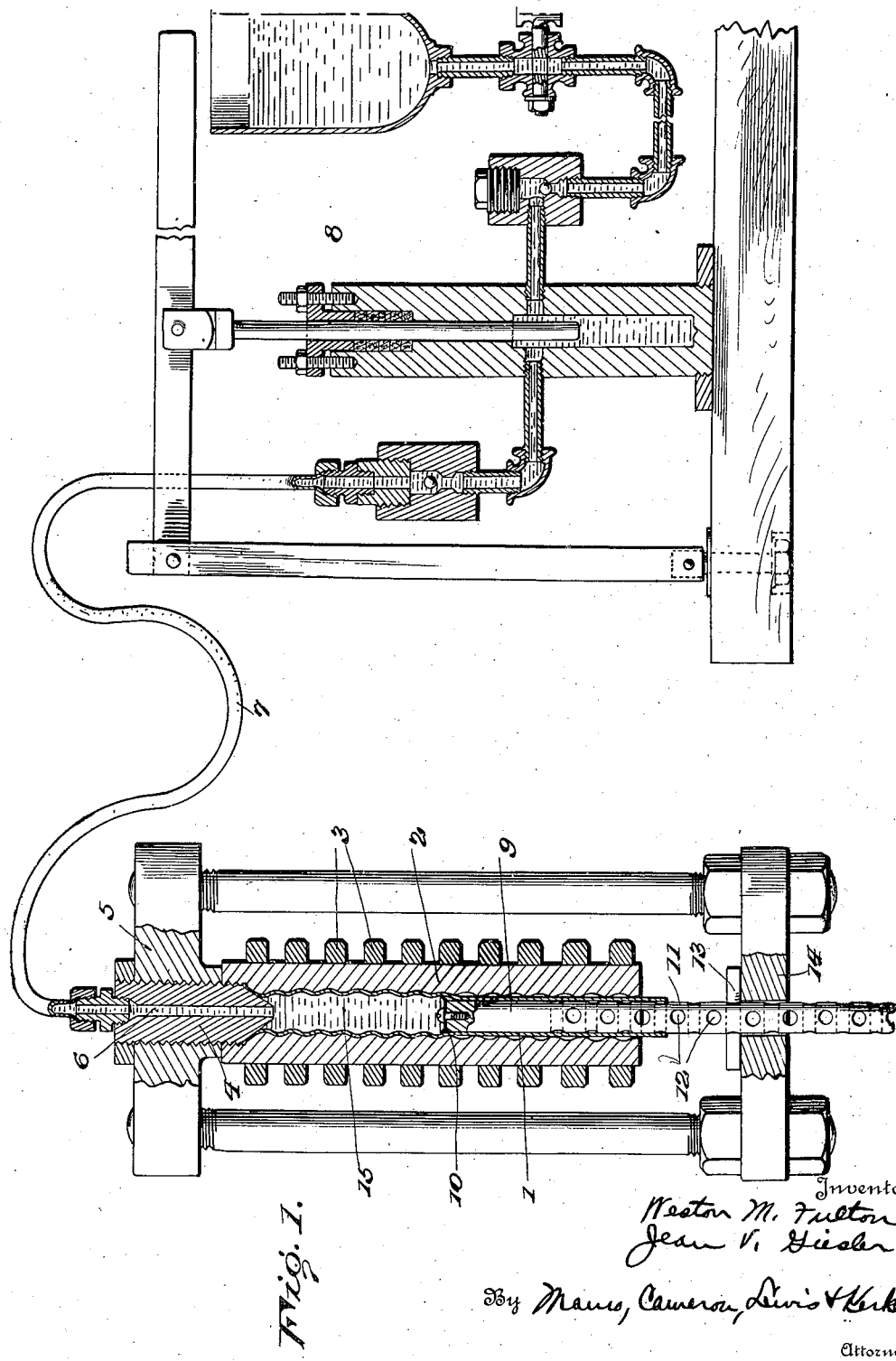
Figure 1 is a more or less diagrammatic view of suitable apparatus for carrying out the present invention, the means for exerting longitudinal force on the wall being omitted.

In accordance with the present invention, the wall to be corrugated, which may be of any suitable thickness and of a wide variety of shapes, is mounted in operative relation to a corrugated die or form. In the drawings the invention is shown as applied to the corrugating of a tubular wall 1 positioned in operative relation to a tubular corrugated form or die 2 which may conveniently be made in halves and the halves clamped firmly together by a plurality of rings 3 driven on to the tapered external surface of the form or die 2. One end of the wall is suitably clamped fixedly in the die, as by a threaded plug 4 which has threaded engagement with both the die 2 and the frame work 5. Said plug is shown as provided with a passage 6 with which communicates suitable piping 7 leading from any suitable apparatus for developing pressure, such as the pump diagrammatically illustrated at 8 for developing hydrostatic pressure, this term being used as generic to the application of pressure by the use of oil, water, or any other suitable fluid. It is to be expressly understood, however, that the apparatus shown for developing pressure is to be taken as typical of any suitable means for supplying pressure to effect the corrugating of the wall.

Mounted within the tubular wall 1, in the form shown, is a piston or plunger 9 provided with a suitable packing 10 to prevent the leakage of fluid between said plunger and the wall of the tube. The rod or stem 11 of said plunger is shown as provided with a plurality of apertures 12 which are spaced by distances equal to the spacing of the ridges of the form or die 2. A pin 13 is adapted to be inserted in the respective apertures 12 and to co-act with the base 14 of the frame to predetermine the position of the plunger 9 and prevent the pressure within the confined space 15 from forcing the plunger beyond its predetermined position. The illustration of the pin 13 insertable in the apertures 12 for cooperation with frame 14 is to be taken, however, as merely typical of any suitable device for indexing or predetermining the extent of movement of the plunger 9 each time a fresh portion of the wall is to be exposed to the hydrostatic pressure.

To corrugate a tubular wall in the apparatus so far outlined, the wall is clamped in the die or form 2 by the plug 4 and the plunger 9 is inserted into said wall until only that portion of the wall overlying the uppermost corrugation of the die is exposed within the confined space between the plug 4 and the plunger 9. The plunger is retained in this position by insertion of the pin 13 in the aperture 12 which is flush with the surface of the base 14, the frame being adjusted if necessary to properly position the aperture with respect to the frame. Hydrostatic pressure is then admitted to the confined space between the plug and plunger and the wall is forced into the corrugation or inter-ridge space of the die, the uncorrugated portion of the wall slipping over the plunger and die to supply the material which forms the corrugation. The pin 13 is then withdrawn from its aperture and introduced into the next adjacent aperture. Hydrostatic pressure is then again admitted to the confined space between the plug and plunger and its first operation is to move the plunger until the plunger is displaced by the predetermined amount which is represented by the spacing of the apertures 12 and which conforms with the spacing of the ridges or corrugations of the die. When the pin 13 engages the base 14 the plunger can be displaced no further and the hydrostatic pressure is increased to force the wall into the next corrugation of the die. This procedure is repeated, alternately predetermining the extent of displacement of the plunger and forming the corrugations by hydrostatic pressure until the entire wall has been progressively corrugated by intermittent applications of pressure.

The friction of the tubular wall 1 on the die 2 and the plunger 9 opposes free longitudinal displacement of the uncorrugated portion of the wall and this frictional opposition is productive of an undesirable stretching and thinning of the wall to an extent which varies with the amount of said frictional opposition to the movement of said wall. To overcome this opposition and insure that the wall shall move longitudinally and flow freely into the corrugations of the die under the transverse pressure exerted thereon, any suitable means employing weight, spring, hydraulic, pneumatic or other pressure may be provided for exerting a longitudinal force on said wall. In the form shown, a collar 16 is mounted freely on the rod or stem 11 of the plunger 9 so as to engage the lower end of the tubular wall 1 and means of any suitable construction are provided to exert a predetermined axial pressure on said collar 16 and wall 1. The apparatus illustrated comprises a lever 17 pivoted at 18 on a bracket 19 projecting from the frame and formed at its inner end as shown at 20 to engage a flange 21 on the collar 16. The outer end of the lever carries a weight 22 which may be varied predeterminately. It is to be understood, however, that the weight is only shown as typical of any suitable means for exerting a force of compression on the wall 1.

The longitudinal force exerted on the wall 1 tends to compress said wall into the corrugations of the die and aids the transverse pressure or bending force in forming the corrugations. The quantity of force exerted longitudinally of the wall can be varied considerably in accordance with the nature of the wall being operated upon. It should be less than the strength of the material of the wall to resist crushing or buckling so as to insure against any tendency to buckling or the formation of "body wrinkles", while on the other hand it should be at least as great as the opposition to movement of the wall longitudinally of the die so as to insure that the wall shall flow freely under the transverse bending pressure and prevent an undesirable or axial stretching and thinning of the material of the wall. By selecting a longitudinal force between these extremes the formation of the corrugations under the transverse bending pressure is greatly facilitated and this longitudinal force may be selected of such a value as to enable the formation of the corrugations by hydrostatic pressure much less than would be necessary if the longitudinal force were not employed. In fact, it has been found from experience that, particularly in the manufacture of relatively thick corrugated tubes of small diameter, the hydrostatic pressure may be reduced as much as seventy-five per cent or more when applying longitudinal force to the wall and at the same time a wall of more uniform thickness be obtained than when using the higher hydrostatic pressure in the absence of longitudinal force.

The method heretofore described of corrugating walls may be employed to form the final or relatively deep, narrow corrugations in the wall in the first instance, but it is preferably employed for the formation of initial corrugations in the wall as illustrated and the corrugations are thereafter deepened by similar or other suitable corrugating operations. In the preferred practice of this invention the initial corrugations formed by the above described method are deepened and narrowed by one or more rolling operations, such for example as described in Fulton Patent No. 971,838, granted Oct. 4, 1910, so as to work resilience to the desired extent into the bends of the corrugations. This rolling method may also be employed to complete corrugated walls which are formed by hydrostatic pressure alone whether with or without the application of a longitudinal force.

While the method of corrugating walls above described is shown as applied to the formation of corrugations from the interior of the tube, it is to be understood that the invention is applicable to the formation of corrugations from the exterior of the tube and, in fact, is not only applicable to the corrugating of tubular walls of any suitable cross section but also to the corrugating of non-tubular walls of any suitable conformation. Furthermore, while the preferred practice of the invention embraces the progressive corrugating of the walls by intermittently subjecting fresh portions thereof to the bending and compression forces, the invention is not limited thereto. Again, while the invention has particular utility in the formation of corrugations in relatively thin walls to provide walls which are readily flexible and suitable for use in diaphragms, temperature and pressure-responsive members, etc., it is also applicable to the formation of corrugations in relatively thick walls and, in fact, reduces the amount of pressure that must be exerted to form corrugations in relatively thick walls.

It will also be perceived that a simple and rapid process has been provided for corrugating walls which insures that a wall of substantially uniform thickness will be formed without an undesirable stretching or thinning of the material of the blank. While the preferred practice has been described with considerable particularity it is to be expressly understood that the invention is not limited thereto as the invention may be carried out in a variety of ways while certain features thereof are capable of use without other features thereof. Furthermore, it is to be expressly understood that the apparatus shown is for purposes of illustration only and is to be taken as typical of any suitable means for carrying out the steps of the method described. Reference is therefore to be had to the claims hereto appended for a definition of the limits of this invention.

What we claim is:—

1. The method of making flexible corrugated tubular walls which includes positioning a tube in a die having axially-spaced ridges and subjecting said tube to simultaneous but separately-applied forces acting radially and axially of said tube to force said tube into said die.

2. The method of making flexible corrugated tubular walls which includes positioning a tube in operative relation to a die, and forming a plurality of corrugations in said tube by radial pressure while separately-applying an axial pressure to collapse said tube sufficiently so that the longitudinal elements of the tube are no longer after than they were before the formation of corrugations.

3. The method of making flexible corrugated tubular walls which includes positioning a tube in a die adapted to form a plurality of corrugations therein, and forming corrugations in said tube by the combined action of hydrostatic pressure and a force acting longitudinally of said tube and separately-applied thereto.

4. The method of making flexible corrugated tubular walls which includes positioning a tube in operative relation to a die adapted to form a plurality of corrugations therein, applying hydrostatic pressure to said tube, and while maintaining a hydrostatic pressure on said tube, collapsing said tube axially by a separately-applied force of sufficient magnitude to prevent stretching of the tube in an axial direction.

5. The method of making flexible corrugated tubular walls which includes positioning a thin-walled tube in operative relation to a die, and forming a plurality of corrugations in said tube by subjecting said tube to a hydrostatic pressure of insufficient magnitude to form the desired corrugations therein, and separately-applying a collapsing force to said tube to form corrugations therein with the aid of said hydrostatic pressure.

6. The method of making flexible corrugated tubular walls which includes positioning a thin-walled tube in operative relation to a die, and forming a plurality of corrugations therein by subjecting the curved surface of said tube to hydrostatic pressure and separately-applying a collapsing force lengthwise of said tube to aid said hydrostatic pressure in forming corrugations while preventing axial stretching of said tube as said tube expands circumferentially to form corrugations.

7. The method of making flexible corrugated tubular walls which includes positioning a thin-walled tube in operative relation to a die adapted to form a plurality of corrugations therein, and subjecting said tube to the combined action of separately-appliable forces of radial expansion and axial contraction.

8. The method of corrugating walls which comprises positioning the wall in operative relation to a die and forming corrugations consecutively by hydrostatic pressure while subjecting said wall to a force acting longitudinally of the same.

9. The method of corrugating walls which comprises positioning the wall in operative relation to a die and forming corrugations consecutively by a bending force while subjecting said wall simultaneously to a force of compression to aid said bending force.

10. The method of making corrugated tubes which includes forming corrugations in a tube by hydrostatic pressure and then subjecting said corrugations to a rolling operation.

11. The method of corrugating tubular walls which comprises positioning a tubular wall in operative relation to a die and forming corrugations consecutively by a transverse force supplemented by a longitudinal force less than the crushing strength of the material of the wall.

12. The method of making flexible corrugated walls which includes positioning a tube in operative relation to a die, forming corrugations in said tube by hydrostatic pressure, and then subjecting said corrugations to a rolling operation.

13. The method of making flexible corrugated walls which includes positioning a tube in operative relation to a die, forming corrugations in said tube by hydrostatic pressure, and then narrowing said corrugations.

14. The method of making flexible corrugated tubular walls which comprises positioning a tubular wall in operative relation to a die and subjecting successive portions of the wall to hydrostatic pressure and a force which tends to assist the expansion of the wall into the die.

15. The method of corrugating walls which comprises positioning the wall in operative relation to a die and subjecting sucessive portions of the wall to hydrostatic pressure and a force of compression which is capable of overcoming the frictional opposition to movement of the wall.

16. The method of corrugating tubes which comprises positioning a tube in operative relation to a tubular die progressively uncovering the portions of the tube opposite successive corrugations of the die, and successively subjecting the uncovered portions of the tube to bending and compression forces.

17. The method of corrugating tubes which comprises positioning a tube in operative relation to a tubular die, progressively uncovering the portions of the tube opposite successive corrugations of the die, and successively subjecting the uncovered portions of the tube to hydrostatic pressure and a force acting longitudinally of the tube.

18. The method of corrugating tubes which comprises positioning a tube in operative relation to a tubular die, positioning a plunger in said tube, advancing the plunger in said tube, advancing the plunger in termitently to uncover the portions of the tube opposite corrugations of said die, and subjecting the uncovered portion of the tube to hydrostatic pressure and a force acting longitudinally of the tube after each intermittent movement of said plunger.

19. The method of corrugating tubes which comprises positioning said tube in operative relation to a tubular die, positioning a plunger in said tube, and alternately predetermining the extent of movement of said plunger and admitting hydrostatic pressure to said tube to move said plunger and corrugate the portions of said tube.

20. The method of corrugating walls which comprises positioning a wall in operative relation to a die and by hydrostatic pressure intermittently uncovering portions of said wall and pressing the uncovered portions of said wall into said die.

21. The method of corrugating walls which comprises positioning a wall in operative relation to a die and by hydrostatic pressure intermittently uncovering portions of said wall and pressing the uncovered portions of said wall into said die while subjecting said wall to a force acting longitudinally of said wall.

22. The method of corrugating tubes which comprises positioning a tube in operative relation to a die, progressively uncovering portions of said tube by hydrostatic pressure, and progressively pressing the uncovered portions of said tube into said die by said hydrostatic pressure.

23. The method of making flexible corrugated walls which includes positioning a tube in operative relation to a die, forming corrugations in said tube by hydrostatic pressure, and then deepening and narrowing said corrugations by mechanical treatment.

24. The method of making flexible corrugated walls which includes positioning a tube in operative relation to a die, forming corrugations in said tube by hydrostatic pressure, and then working said corrugations to impart resilience thereto.

25. The method of making flexible corrugated tubular walls which includes subjecting a tube to hydrostatic pressure acting transversely of the tube and to a separate force coacting with said transverse pressure and acting in the direction of the length of said tube to aid said transverse pressure in forming corrugations, and then treating the corrugations to impart resilience thereto.

26. The method of making flexible corrugated tubular walls which comprises positioning a wall in operative relation to a die adapted to form corrugations therein and progressively forcing the wall into the successive corrugations of said die by hydrostatic pressure and a separate force acting longitudinally of the wall.

27. The method of making flexible corrugated tubular walls which comprises positioning a wall in operative relation to a die adapted to form corrugations therein and progressively forcing the wall into the successive corrugations of said die by bending and compression forces.

28. The method of corrugating walls which comprises positioning a wall in operative relation to a die, forcing the wall into said die by hydrostatic pressure, and subsequently rolling said corrugations to render the bends resilient.

29. The method of corrugating walls which comprises positioning a wall in operative relation to a die, forcing the wall into said die by hydrostatic pressure, and subsequently deepening said corrugations by a rolling operation.

30. The method of corrugating walls which comprises positioning a wall in operative relation to a die, forcing the wall into said die by hydrostatic pressure and a force acting longitudinally of the same, and subsequently subjecting said corrugations to a rolling operation.

31. The method of making flexible corrugated tubular walls which comprises positioning a wall in operative relation to a die, progressively subjecting successive portions of the wall to pressure, and exerting a separate force on the wall to overcome resistance to longitudinal movement.

32. The method of making flexible corrugated tubular walls which comprises positioning a wall in operative relation to a die, bending the wall successively into the die by pressure, and preventing elongation of the wall by a separate force applied longitudinally thereof.

33. The method of making flexible corrugated tubular walls which comprises positioning a wall in operative relation to a die, subjecting said wall to pressure less than that necessary to force the wall into said die, and applying a force acting longitudinally of said wall to supplement said pressure and force the wall successively into the corrugations of said die.

34. The method of corrugating walls which comprises positioning the wall in operative relation to a die, intermittently uncovering portions of said wall, and alternately subjecting the uncovered portions to hydrostatic pressure while exerting compression longitudinally of said wall.

35. The method of making flexible corrugated tubular walls which includes positioning a tube in operative relation to a die, forming corrugations in said tube by the combined action of forces acting transversely of and longitudinally of said tube, and then subjecting said corrugations to a rolling operation.

36. The method of making flexible corrugated tubular walls which comprises positioning a tubular wall in operative relation to a die, intermittently uncovering portions of said wall by hydrostatic pressure, and then applying the hydrostatic pressure to force the uncovered portions into said die.

37. The method of corrugating walls which comprises positioning the wall in operative relation to a die, positioning a member in protective relation to said wall, and alternately predetermining the limit of displacement of said member and applying hydrostatic pressure to the confined space determined by said member to first displace said member to uncover a portion of said wall and then to press the uncovered portion into said die.

38. The method of corrugating walls which comprises positioning the wall in operative relation to a die, and forcing the wall into said die by a pressure normal to said wall and a supplemental pressure acting longitudinally of the wall to aid the bending of said wall under said normal pressure.

39. The method of corrugating tubes which comprises positioning the tube in operative relation to a tubular die having axially-spaced ridges, subjecting the tube to radial pressure to force its wall into the inter-ridge spaces of said die, and compressing the tube axially to aid the bending of said wall under said radial pressure.

40. The method of making flexible corrugated tubular walls which includes positioning a tube in operative relation to a die, forming corrugations in said tube by the combined action of forces acting transversely of and longitudinally of said tube, and then narrowing said corrugations.

41. The method of making flexible corrugated tubular walls which includes positioning a tube in operative relation to a die, forming corrugations in said tube by the combined action of forces acting transversely of and longitudinally of said tube, and then working said corrugations to impart resilience thereto.

42. The method of making flexible corrugated tubular walls which includes positioning a tube in operative relation to a die, forming corrugations in said tube by the combined action of forces acting transversely of and longitudinally of said tube, and then deepening and narrowing said corrugations by mechanical treatment.

43. In a method of making corrugated hollow metallic walls, the steps which consist in radially expanding a tube wall in a die into corrugations while simultaneously axially collapsing such tube during such radial expanding operation a distance sufficient so that the final length of tube wall measured along an elemental longitudinal line is not greater after than it was before said radial expansion.

44. The method of making flexible corrugated tubular walls which includes positioning a tube in operative relation to a die, subjecting the metal of the tube to fluid pressure and a separately-applied force to contract said tube axially and to form corrugations therein, and then subjecting said corrugations to a working operation.

45. The method of making flexible corrugated tubular walls which includes positioning a tube in operative relation to a die, subjecting the metal of the tube to fluid pressure and a separately-applied force to contract said tube axially and to form corrugations therein, and then changing the shape of said corrugations.

46. The method of making flexible corrugated tubular walls which includes positioning a tube in operative relation to a die, subjecting the metal of the tube to fluid pressure and a separately-applied force to contract said tube axially and to form corrugations therein, and working said corrugations to add resilience thereto.

47. The method of making flexible corrugated tubular walls which includes subjecting a tube to a radially acting pressure and to a separately but simultaneously appliable force of compression which acts axially of the tube to aid said radial pressure in forming corrugations, and then working the wall to impart the desired resilience thereto.

48. The method of making thin resilient corrugated tubular walls which includes subjecting a tube to simultaneously but separately-applied forces of bending and compression to force the tube to assume a corrugated form, and then mechanically treating the corrugations to impart the desired resilience thereto.

49. The method of making thin resilient corrugated tubular walls which includes positioning a thin-walled tube in operative relation to a die, and forming a plurality of corrugations in said tube by the combined action of separately-applied forces acting radially and axially on said tube.

50. The method of making flexible corrugated tubular walls which includes positioning a thin-walled tube in operative relation to a die, and forming a plurality of corrugations therein by separately-applying to said tube an interior fluid pressure of insufficient magnitude to form the desired corrugations and an axially directed collapsing force of sufficient magnitude to aid said fluid pressure and cause the tube to assume a corrugated form.

In testimony whereof we have signed this specification.

WESTON M. FULTON.
JEAN V. GIESLER.